United States Patent
Abbar et al.

(10) Patent No.: US 7,231,590 B2
(45) Date of Patent: Jun. 12, 2007

(54) METHOD AND APPARATUS FOR VISUALLY EMPHASIZING NUMERICAL DATA CONTAINED WITHIN AN ELECTRONIC DOCUMENT

(75) Inventors: Mohamed Anas Abbar, Redmond, WA (US); Athapan Arayasantiparb, Redmond, WA (US); Thiti Wang-Aryattawanich, Sammamish, WA (US)

(73) Assignee: Microsoft Corporation, Remond, WA (US)

( * ) Notice: Subject to any disclaimer, the term of this patent is extended or adjusted under 35 U.S.C. 154(b) by 505 days.

(21) Appl. No.: 10/776,431

(22) Filed: Feb. 11, 2004

(65) Prior Publication Data
US 2005/0177789 A1    Aug. 11, 2005

(51) Int. Cl.
G06F 15/00    (2006.01)
(52) U.S. Cl. .......................................... 715/500; 707/6
(58) Field of Classification Search ................ 715/500, 715/509, 526, 530; 707/6
See application file for complete search history.

(56) References Cited

U.S. PATENT DOCUMENTS

| | | | |
|---|---|---|---|
| 5,225,981 A | | 7/1993 | Yokogawa et al. |
| 5,379,420 A | * | 1/1995 | Ullner ............................ 707/6 |
| 5,418,718 A | * | 5/1995 | Lim et al. .................... 715/536 |
| 5,708,804 A | | 1/1998 | Goodwin et al. ........... 395/603 |
| 5,918,238 A | * | 6/1999 | Hayashi ...................... 715/526 |
| 5,974,409 A | | 10/1999 | Sanu et al. .................... 707/3 |
| 5,983,268 A | * | 11/1999 | Freivald et al. ............. 709/218 |
| 6,006,218 A | | 12/1999 | Breese et al. ................... 707/3 |
| 6,085,204 A | * | 7/2000 | Chijiwa et al. ............. 715/529 |
| 6,091,896 A | * | 7/2000 | Curreri et al. .............. 717/125 |
| 6,133,916 A | * | 10/2000 | Bukszar et al. ............. 715/744 |

(Continued)

OTHER PUBLICATIONS

Dyck, Timothy, "Text Searches Suit DataSpot; Review: Upgrade is easier to use, but numeric query functions are limited," *PCWEEK*, Jul. 14, 1997, vol. 14, No. 30, p. 61.
"Search Services & Gateways: STN Enhances Numeric Search Software," *Database Searcher*, ISSN: 0891-6713, vol. 6, No. 4, May 1990, p. 20.
European Search Report dated Jun. 22, 2006.
Andrei Mikheev et al., "XML tools and architecture for Named Entity recognition," Markup Languages: Theory & Practice 1.3, MIT Press, vol. 1, No. 3, 1999, pp. 89-113.
Robert C. Miller, "Lightweight Structure in Text," Online Thesis Summary (URL:http://www.cs.cmu.edu/{rcm/papers/thesis/summary.pdf), May 7, 2002, pp. 1-12.

*Primary Examiner*—Cong-Lac Huynh
(74) *Attorney, Agent, or Firm*—Merchant & Gould (57) ABSTRACT

A method and apparatus are provided for visually emphasizing all of the numerical data contained in an electronic document. A determination is made as to whether a request to emphasize all of the numerical data in the electronic document has been received. If such a request is received, all of the numerical data within the electronic document is located and emphasized. Emphasizing may include adding a highlighting attribute to the located numerical data or adding other formatting to visually distinguish the numerical data from the remainder of the electronic document. A request may also be received to deemphasize the located numerical data. In response to receiving such a request, the emphasis is removed from the located numerical data.

19 Claims, 5 Drawing Sheets

U.S. PATENT DOCUMENTS

| | | | | |
|---|---|---|---|---|
| 6,154,752 | A * | 11/2000 | Ryan | 715/501.1 |
| 6,185,330 | B1 * | 2/2001 | Hirao | 382/181 |
| 6,460,029 | B1 | 10/2002 | Fries et al. | 707/3 |
| 6,745,229 | B1 * | 6/2004 | Gobin et al. | 709/206 |
| 6,956,662 | B1 * | 10/2005 | Kamimura | 358/1.15 |
| 7,010,520 | B2 * | 3/2006 | Agrawal et al. | 707/3 |
| 7,089,229 | B2 * | 8/2006 | Goldman et al. | 707/3 |
| 7,111,236 | B1 * | 9/2006 | Isensee et al. | 715/528 |
| 2001/0043740 | A1 * | 11/2001 | Ichikawa et al. | 382/176 |
| 2002/0187815 | A1 * | 12/2002 | Deeds et al. | 455/564 |
| 2003/0225745 | A1 | 12/2003 | Goldman et al. | |
| 2005/0004935 | A1 * | 1/2005 | Thede | 707/102 |
| 2005/0015524 | A1 * | 1/2005 | Yamada | 710/62 |
| 2005/0050044 | A1 * | 3/2005 | Takagi et al. | 707/6 |
| 2005/0086216 | A1 * | 4/2005 | Davis | 707/3 |
| 2006/0010379 | A1 * | 1/2006 | Kashi | 715/531 |
| 2006/0190195 | A1 * | 8/2006 | Watanabe et al. | 702/32 |

* cited by examiner

METHOD AND APPARATUS FOR VISUALLY EMPHASIZING NUMERICAL DATA CONTAINED WITHIN AN ELECTRONIC DOCUMENT

TECHNICAL FIELD

The invention generally relates to the field of electronic document processing and, more specifically, to the field of visually emphasizing numerical data contained within an electronic document.

BACKGROUND OF THE INVENTION

Modern word processing application programs are utilized to prepare a wide variety of different document types. For instance, some users utilize word processing application programs to prepare text documents that include a large amount of numerical information. As an example, a corporate lawyer may utilize a word processing application program to create text documents that include a large amount of numerical data for filing with the Securities and Exchange Commission.

Although modern word processing application programs include an endless array of tools for creating and editing text documents, these same word processors lack functionality for assisting a user in creating and editing a text document that includes numerical data. One shortcoming of current word processing applications programs in particular is exposed when a user attempts to locate numerical information in a text document utilizing a standard "find" function.

Unlike text strings, numerical information is more difficult to locate using the typical "find" function provided by current word processing application programs. Users are able to locate a text search string in a document using a typical "find" function because they have a preconceived knowledge of the string that they are looking for. For example, if a user is looking for the name "John" in a document, the user can easily modify the search string to match the desired string through a relatively small number of iterations. However, if a user is searching for a number that they do not already know, a telephone number for instance, it may be very difficult to locate the number in the document. The user may be forced to scan through the entire document until the desired number can be located. This can be very time consuming and frustrating for a computer user, especially if the document is a long one.

It is with respect to these considerations and others that the various embodiments of the present invention have been made.

SUMMARY OF THE INVENTION

In accordance with the present invention, the above and other problems are solved by a method and apparatus for visually emphasizing numerical data contained within an electronic document. According to the various embodiments of the invention, all numerical data within an electronic document, including numerals and numerals expressed as text data, may be easily emphasized to distinguish the numerical data from the other contents of the electronic document. By emphasizing all numerical data in the electronic document, a user may easily locate one or more numbers within a large body of text data. The emphasis may be quickly applied to the numerical data and then easily removed once the user has located the desired numerical data.

According to one aspect of the invention, a method is provided for emphasizing numerical data contained in an electronic document. The electronic document may comprise both text data and numerical data. The numerical data may include cardinal numbers (1, 2, 3 . . . ) and numerical data expressed as text data (one, two, three . . . ). Numerical data expressed as text data may include cardinal numbers expressed as text strings (one, one-thousand, two-hundred . . . ), ordinal numbers (first, second, third . . . ), or roman numerals (I, II, III . . . ). Additionally, the numerical data may be expressed in any language, including languages that utilize characters rather than letters, such as Chinese, Japanese, and other far east and Asian languages.

According to the method, a determination is made as to whether a request to emphasize all of the numerical data in the electronic document has been received. Such a request may be received, for instance, in response to a user selecting a toolbar icon or a menu item from a pull-down menu within an application program for editing the electronic document. If such a request is received, all of the numerical data within the electronic document is located and emphasized. Emphasizing may include adding a highlighting attribute to the located numerical data. The highlighting attribute may be a color attribute, a bold attribute, an underline attribute, or other type of text attribute that distinguishes the located numerical data from the remainder of the contents of the electronic document when displayed. If the attribute comprises a color attribute, a unique color attribute may be specified for string numbers, ordinal numbers, and roman numerals located within the electronic document. By visually emphasizing all of the numerical data contained in an electronic document in this manner, a user can easily identify numeric information contained within an electronic document.

According to other aspects of the invention, a request may also be received to deemphasize the located numerical data. Such a request may be provided by a user utilizing a toolbar icon or a menu item within a pull-down menu. Such a request may be provided once the user no longer needs the numerical data to be emphasized. In response to receiving such a request, the emphasis is removed from the located numerical data. This may be performed, for instance, by again searching for all of the numerical data within the electronic document and removing the highlighting attributes from the located data. In this manner, the electronic document is returned to its original state prior to emphasizing the numerical data.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
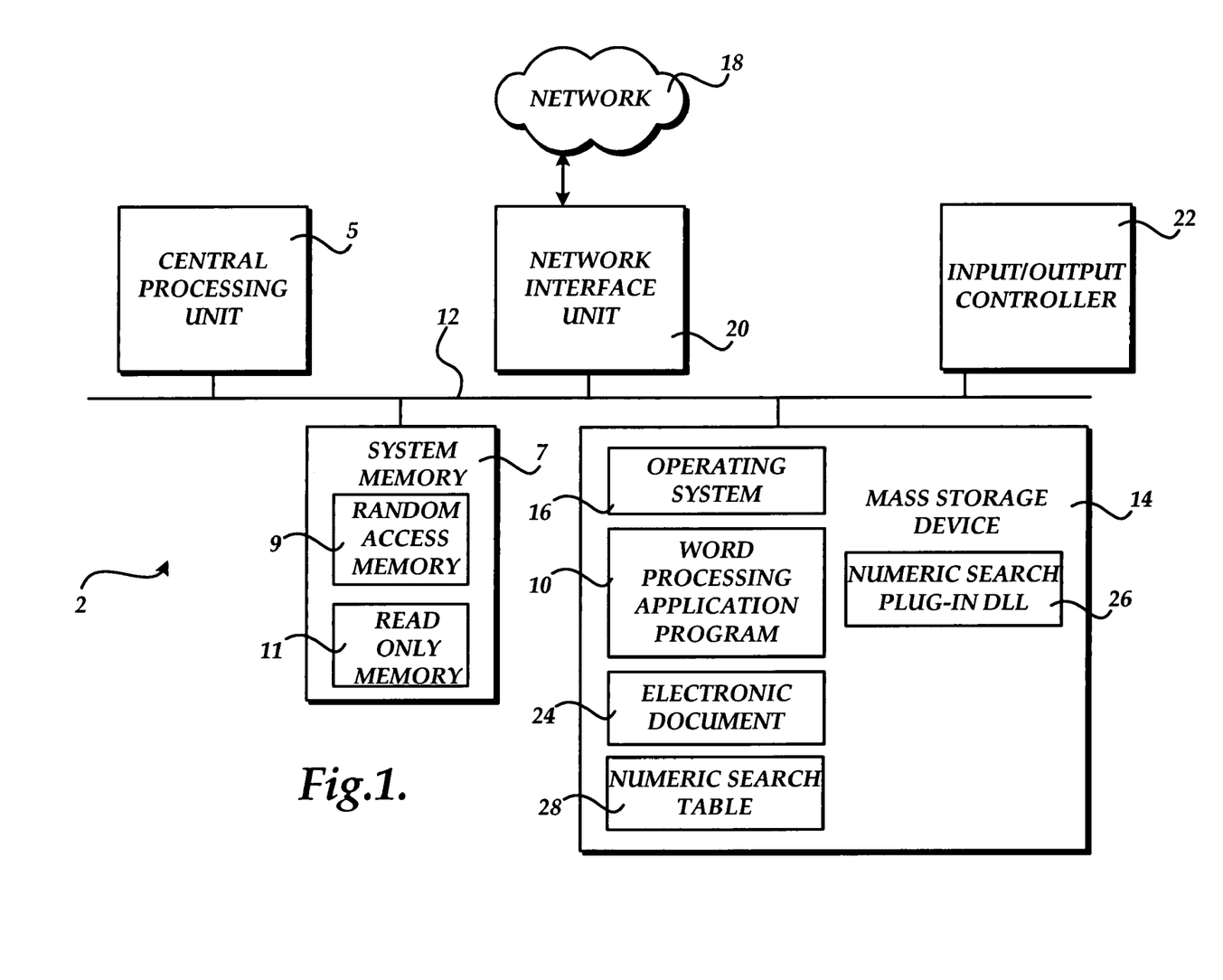
FIG. 1 is a computer system architecture diagram illustrating a computer system utilized in and provided by the various embodiments of the invention.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the electronic document 24. According to one embodiment of the invention, the word processing application program 10 comprises the WORD word processing application program from MICROSOFT CORPORATION. It should be appreciated, however, that other word processing application programs from other manufacturers may be utilized to embody the various aspects of the present invention.

In conjunction with the editing of a word processing document, the word processing application program 10 provides conventional functionality for allowing a user to create, edit, and view electronic documents containing text data and numerical data in any language. As described herein, the phrase numerical data may encompass both cardinal numbers (1, 2, 3 . . . ) and numerical data expressed as text data. Numerical data expressed as text data includes cardinal numbers expressed as text strings (one, two, three . . . ), ordinal numbers (first, second, third . . . ), and roman numerals (I, II, III, IV . . . ). Additionally, both cardinal numbers and numerical data expressed as text data may be expressed in any language using the characters or alphabet normally utilized by a particular language. For instance, embodiments of the invention may be utilized to emphasize characters expressing numerical information in European, Chinese, Japanese, or other far east and Asian languages.

In order to provide the functionality described herein, the word processing application program 10 may operate in conjunction with a numeric search plug-in dynamically linked library ("DLL"). As will be described in greater detail below, the numeric search plug-in DLL 26 integrates with the word processing application program 10 and provides functionality for emphasizing all of the numerical data within an electronic document 28. The numeric search plug-in DLL 26 also provides functionality for de-emphasizing all of the numerical data within an electronic document 28. To provide these functions, the numeric search plug-in DLL 26 utilizes a program code for breaking sentences into words. Once the sentences have been broken into words, the numeric search plug-in DLL 26 compares the words to the contents of the numeric search table 28 to determine if numerical data is contained in the document. The numeric search table 28 identifies to the numeric search plug-in DLL 26 all of the numerical data that should be located in each of the supported languages. Additional details regarding the structure and operation of the numeric search plug-in DLL 26, including the structure of the numeric search table 28 are provided below.

Figure 2A:
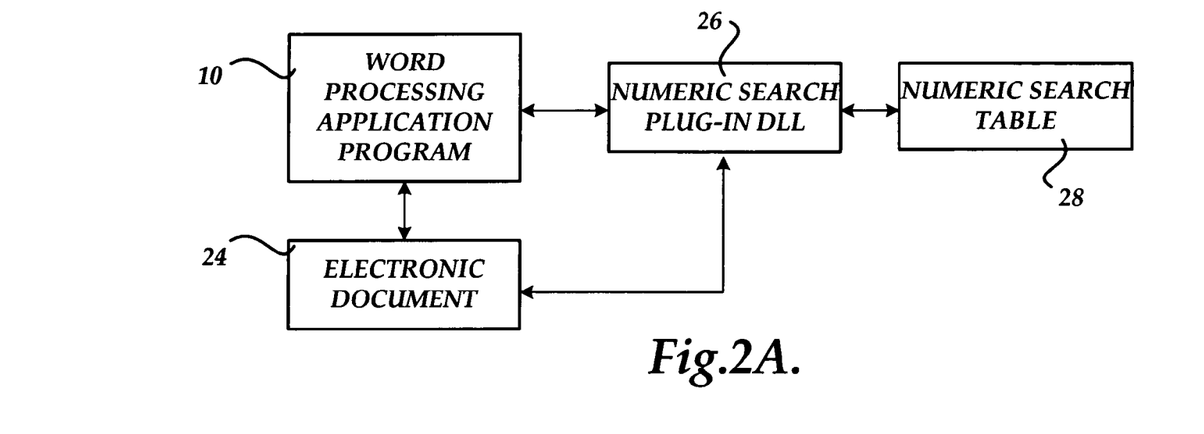
FIG. 2A is a software architecture diagram illustrating aspects of the various software components utilized in an embodiment of the invention.

Referring now to FIG. 2A, additional details regarding the operation of the numeric search plug-in DLL 26 will be described. As illustrated in FIG. 2A, the numeric search plug-in DLL 26 is configured as an add-on module for use with the word processing application program 10. When installed and configured for use with the word processing application program 10, the numeric search plug-in DLL 26 provides a user interface and functionality for emphasizing the numerical data contained in an electronic document 24 that has been opened for viewing and editing by the word processing application program 10. In particular, the numeric search plug-in DLL 26 provides an icon on a toolbar provided by the word processing application program 10. When the icon is selected by a user, the numeric search plug-in DLL 26 accesses the contents of the electronic document 24, searches for all of the numerical data, and emphasizes the data by adding text attributes to the electronic document 10. Access to the contents of the electronic document 24 is made through the use of a document object model ("DOM") supported by the word processing application program 10 and the numeric search plug-in DLL 26. It should be appreciated that a menu item within a pull-down menu or other type of user interface selection object may be provided by the numeric search plug-in DLL 26 for selection by a user. Additional details regarding the user interface provided by the word processing application program 10 and the numeric search plug-in DLL 26 will be provided below with respect to FIGS. 3A and 3B.

Figure 2B:
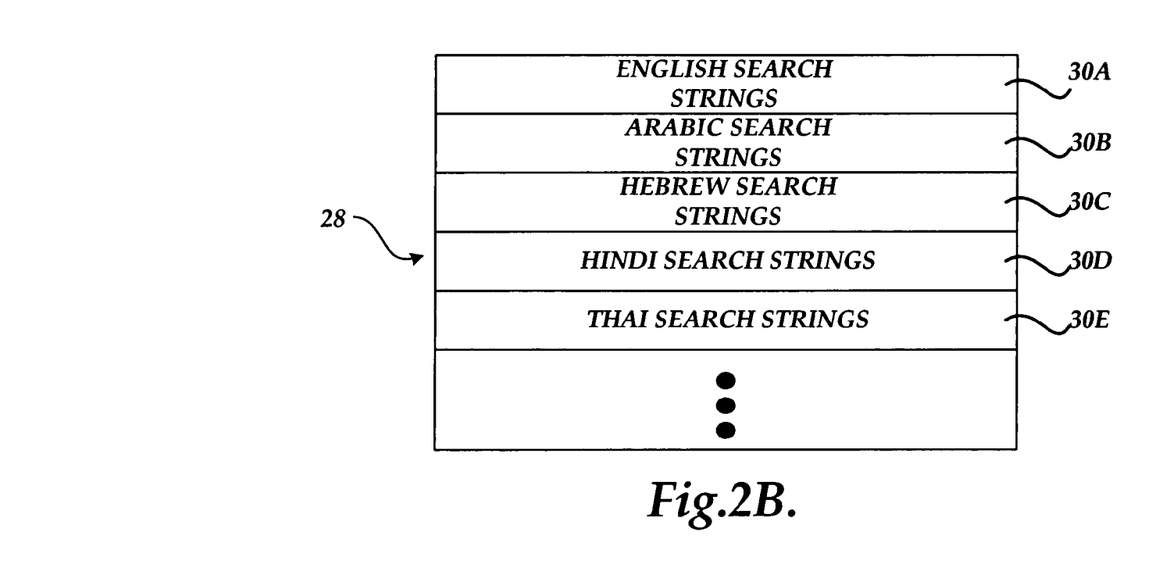
FIG. 2B is a data structure diagram illustrating the contents of an illustrative numeric search table utilized in one embodiment of the invention.

Referring now to FIGS. 2A and 2B, additional details regarding the operation of the numeric search plug-in DLL 26 will be described. As discussed briefly above, in response to a user request the numeric search plug-in DLL 26 searches the entire contents of the electronic document 24 for numerical data. In order to perform this search, the numeric search plug-in DLL 26 utilizes a numeric search table 28. As shown in FIG. 2B, the numeric search table 28 identifies each of the numeric search strings that should be emphasized. For instance, the English search strings 30A identify each of the search strings that should be identified by the numeric search plug-in DLL 26 when searching a document written in the English language (e.g. 1, 2, 3 . . . ; one, two, three . . . ; hundred, thousand, million . . . ).

The numeric search table 28 may also include search strings appropriate for searching for numerical data in documents expressed in other languages. For instance, Arabic search strings 30B, Hebrew search strings 30C, Hindi search strings 30D, and Thai search strings 30E are provided in one embodiment of the invention. It should be appreciated that search strings appropriate for searching documents expressed in any language and using any character set may defined within the numeric search table 28 and utilized by the numeric search plug-in DLL 26 during the search of an electronic document 24. The contents of the numeric search table 28 may also be user-definable so that custom search strings can be added to the numeric search table 28 as desired. The numeric search table 28 may also include the gender-specific expressions of numbers for languages that express numbers with a gender.

Figures 3A, 3B:
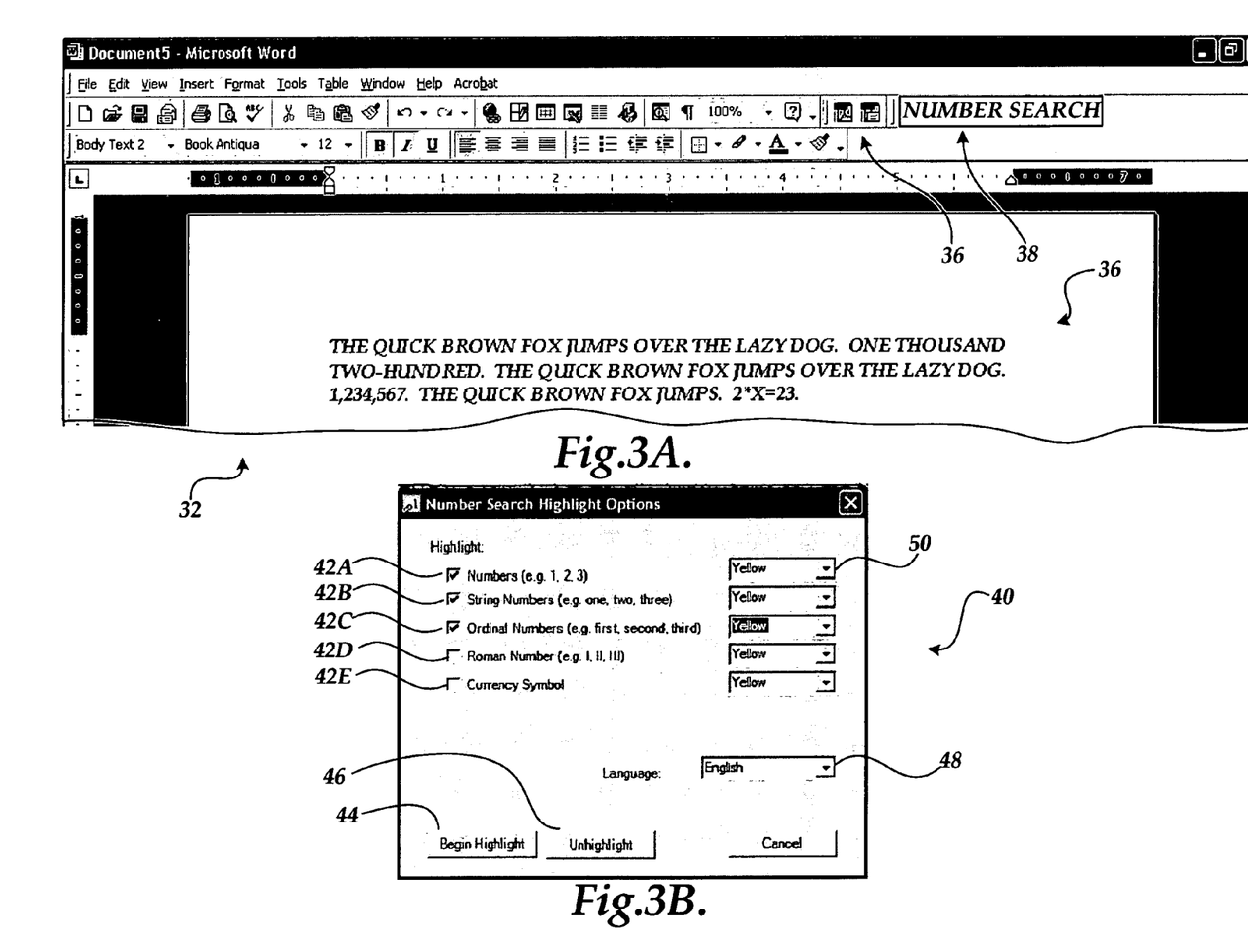
FIGS. 3A and 3B are screen diagrams illustrating various display screens provided by an application program utilized in an embodiment of the invention.

Referring now to FIGS. 3A and 3B, additional details regarding the user interface provided by the word processing application program 10 and the numeric search plug-in DLL 26 will be described. FIG. 3A illustrates a portion of a user interface provided by the word processing application program 10. As shown in FIG. 3A, the word processing application program 10 provides a window 32 including a document editing area 34 and a toolbar 36. As known in the art, the document editing area 34 displays the contents of the electronic document 24 and allows a user to modify the contents of the electronic document 24 in virtually any desired manner. In order to provide quick access to the various editing functions provided by the word processing application program 10, the toolbar 36 includes icons for a number of frequently used features. When installed, the number search plug-in DLL 26 adds a user interface button 38 to the toolbar 36. When selected, the button 38 causes the dialog box 40 shown in FIG. 3B to be displayed.

As illustrated in FIG. 3B, the dialog box 40 includes a number of user interface check boxes 42A-42E that allow a user to specify the type of numerical information to be identified in the electronic document currently open for editing in the document editing area 34. In particular, selection of the check box 42A indicates that numbers (e.g. 1, 2, 3 . . . ) should be located and emphasized, check box 42B indicates that cardinal numbers expressed as strings (e.g. one, two, three . . . ) should be emphasized, the check box 42C indicates that ordinal numbers (e.g. first, second, third . . . ) should be emphasized, check box 42D indicates that roman numbers should be emphasized (e.g. I, II, III, IV . . . ) should be emphasized, and check box 42E indicates that currency symbols, such as the dollar sign ("$"), should be located and emphasized. A user may select as many or as few of the checks boxes 42A-42E as they desire. Alternatively, the numeric search plug-in DLL may be explicitly "hard-coded" with the types of numerical data that should be located when the user interface button 38 is selected.

The dialog box 40 also includes a number of drop down menu controls, such as the control 50, adjacent to each of the check boxes 42A-42E. The drop down menu controls allow a user to identify a unique color attribute that should be utilized to emphasize located numerical data of the specified type. For instance, the drop down menu control 50 may be utilized to specify that a particular color attribute be utilized to emphasize located numbers (e.g. 1, 2, 3 . . . ) if the check box 42A is also completed. The other drop down menu controls may be utilized similarly to specify a unique color for each of the other corresponding types of numerical data. A user may also utilize the drop down menu control 48 to specify the language of the electronic document 10. This selection allows the numeric search plug-in DLL 26 to determine the appropriate contents of the numeric search table 28 to utilize during a search.

The dialog box 40 also includes a button 44 which, when selected, will cause the numeric search plug-in DLL 26 to search the entire electronic document 10 for the specified numerical data. When data is located, it is emphasized in the manner specified by the drop down menu controls. While a search is progressing, the viewable portion of the document may be modified to focus on the portion of the document containing the most recently located numerical data. A user may also pause a search in progress if the user locates the desired information. When finished, the user will be presented with a user interface dialog box indicating the number of instances of numerical data located during the search.

The dialog box 40 also includes a button 46 which, when selected, causes all of the previously-applied emphasis to be undone. In this manner, a user can emphasize all of the numerical data in a document, locate a point of interest by locating emphasized numerical information, and to de-emphasize the numerical data when finished. Additional details regarding the operation of the numeric search plug-in DLL in this regard is described below with respect to FIG. 4.

Figure 4:
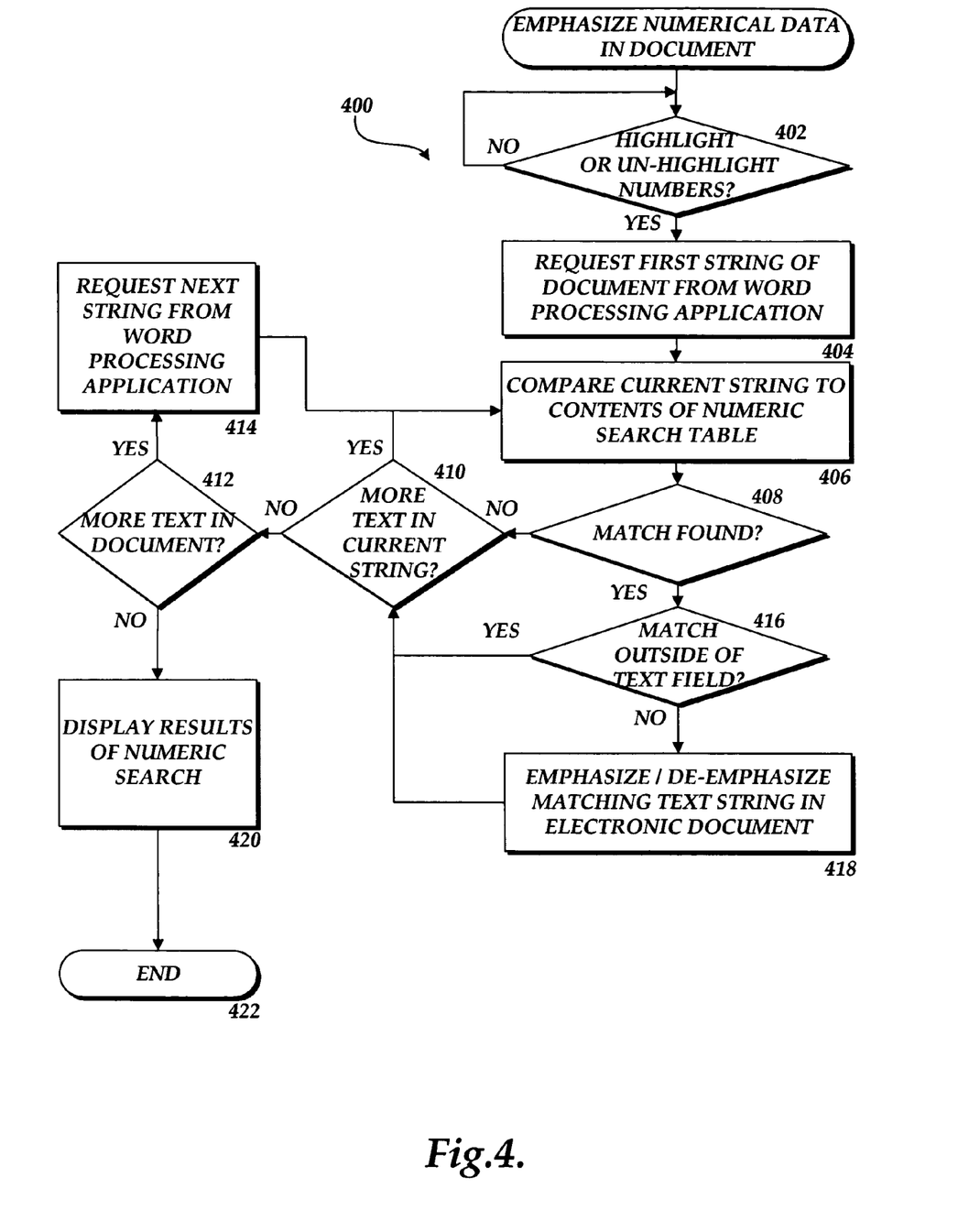
FIG. 4 is a flow diagram illustrating a process for emphasizing numerical data contained within an electronic document in one embodiment of the invention.

Referring now to FIG. 4, an illustrative routine 400 will be described illustrating a process performed by a word processing application program 10 for emphasizing numerical data within an electronic document. It should be appreciated that although the embodiments of the invention described herein are presented in the context of a word processing application program 10, the invention may be utilized in other types of application programs that support the creation, editing, or viewing of documents that contain both text data and numerical data. For instance, the embodiments of the invention described herein may be utilized within a spreadsheet application program, a presentation application program, a drawing or computer-aided design application program, a database application program, a web browser, or other type of application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

The routine 400 begins at decision operation 402, where a determination is made by the numeric search plug-in DLL 26 as to whether a user has requested that the numerical data in an electronic document be emphasized or de-emphasized. As discussed above with respect to FIG. 3B, this may occur in response to the selection of the user interface button 38 and the subsequent selection of one of the buttons 44 or 46 illustrated in FIG. 3B. If no selection has been made, the routine 400 returns to decision operation 402. If, however, a request has been made to emphasize the numerical data in the electronic document 10, the routine 400 continues to operation 404.

At process operation 404, the numeric search plug-in DLL 26 requests from the word processing application 10 a first string of the electronic document 24. The string may comprise a word, sentence, paragraph, or other subset of the entire document 24. In response, the word processing application 10 returns to the numeric search plug-in DLL 26 the requested portion of the document 24. From process operation 404, the routine 400 continues to process operation 406.

At process operation 406, the numeric search plug-in DLL 26 compares the contents of the current string of the electronic document 24 to the appropriate portion of the numeric search table 28. By comparing the contents of the numeric search table 28, the numeric search plug-in DLL 26 can identify all of the numerical data contained within the current string.

It should be appreciated that, according to the various embodiments of the invention, the numeric search plug-in DLL 26 may be configured to identify numbers contained within fractions and within mathematical equations. Additionally, the numeric search plug-in DLL 26 may be programmed to locate numbers that are separated by decimal separators, currency symbols, and other punctuation. The numeric search plug-in DLL 26 may also be programmed to ignore numbers contained in formatting fields, headers, footers, end notes, comments, page numbers, and other portions of the electronic document 24 not likely to contain numerical information that would be of substantial interest to a user.

According to other embodiments of the invention, the numeric search plug-in DLL 26 may be programmed to locate numerical information utilizing pattern matching. For example, in Italian, one hundred is "cento." Two hundred is "Ventucento." One hundred thousand is "centomila" and two hundred thousand is "Ventucentimila." Rather than listing all of the possible combinations for each language in the numeric search table 28, the numeric search plug-in DLL 26 is programmed to locate matching strings. For instance, using the Italian numbers mentioned above, the numeric search plug-in DLL 26 first determines if a string begins with the phrase "cento." If so, the numeric search plug-in DLL 26 will determine if the string ends with the phrase "mila." If so, the numeric search plug-in DLL 26 assumes that the entire word is numerical data. Other numbers in other languages can be identified similarly without listing all possible numbers in the numeric search table 28.

From process operation 406, the routine 400 continues to decision operation 408, where the numeric search plug-in DLL 26 determines if numerical data was located within the current search string. If no numerical data was identified, the routine 400 branches to decision operation 410, where the numeric search plug-in DLL 26 determines if additional data in the current string remains to be searched. If additional data remains to be searched in the current search string, the routine 400 branches to process operation 406 where an additional search is performed. If the current search string does not contain additional data to be searched, the routine 400 branches to decision operation 412, where the numeric search plug-in DLL 26 determines if the document 24 contains additional data to be searched. If the document 24 does contain additional data to be searched, the routine 400 branches to operation 414, where the numeric search plug-in DLL 26 requests the next string of the electronic document 24 from the word processing application program 10. The routine 400 then continues from operation 414 to operation 416 where a search is performed on the new current string.

If, at operation 416, the numeric search plug-in DLL 26 determines that numerical data was found in the current string, the routine 4000 continues to operation 416. At decision operation 416, the numeric search plug-in DLL 26 determines whether the match was located outside of the main body of the document 24. Data, for example, that is located within formatting fields, headers and footers, end notes, comments, or page numbers of the document 24 will be considered outside the main body of the document. If the matching data is located outside of the main body of the document 24, the routine branches from operation 416 to decision operation 410, where a determination is made as to whether more text remains to be processed. However, if the matching data is within the main body of the document 24, the routine 400 continues from operation 416 to process operation 418.

At process operation 418, the located data is emphasized. As described above, emphasizing the located numerical data may comprise adding a highlighting attribute to the data. Any highlighting attribute may be utilized that sets the numerical data apart from the remainder of the document 24. Alternatively, the remaining data may be highlighted, thereby leaving the numerical data in its previous state but easily distinguishable from the remainder of the document.

According to embodiments of the invention, the highlighting attribute may comprise a color attribute, a bold attribute, an underline attribute, an italics attribute, or a change in font or font size. As also described above, unique attributes, such as colors, may be defined by a user for each type of numerical data located within the electronic document. Matching data may also be de-emphasized at operation 418 if it was highlighted during a previous search operation. In this manner, the same routine may be utilized to emphasize and de-emphasize the numerical data in the document 24. By utilizing the same routine it can also be ensured that formatting added manually would not be accidentally removed by the numeric search plug-in DLL 26.

According to embodiments of the invention, an entire mathematical equation may be emphasized, including variables and mathematical operators. Similarly, if a number expressed as text includes spaces or other characters between its component parts, the entire phrase may be emphasized. For instance, the entire phrase "one hundred thousand" would be emphasized, including the spaces between the string numbers. According to embodiments, numeric information formatted using superscript or subscript is also highlighted.

After the highlighting attribute has been added to the matching text, the routine 400 continues to operation 410, where the numeric search plug-in DLL 26 determines whether additional text remains to be searched in the current string. If additional text does not remain to be searched, the routine 400 branches to operation 412, where the numeric search plug-in DLL 26 determines if additional text remains to be searched in the electronic document. If no additional text remains to be searched, the routine 400 branches to operation 420, where the results of the numeric search may be displayed to the user. For instance, the number of instances of numerical data located and highlighted may be identified to the user. Alternatively, if no results were located, the user may be informed that no matches were located. From display operation 420, the routine 400 continues to halt operation 422, where it ends.

Figure 5A:
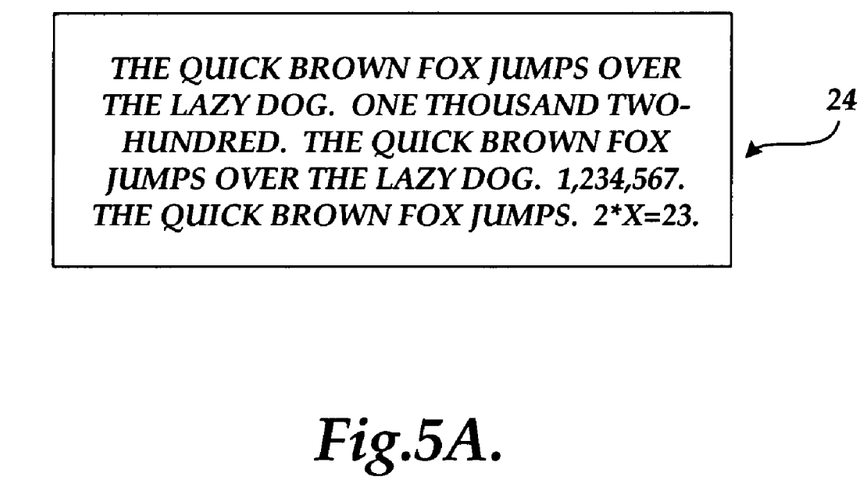
FIGS. 5A and 5B are screen diagrams showing a portion of a screen display provided by an application program in one embodiment of the invention.
Figure 5B:
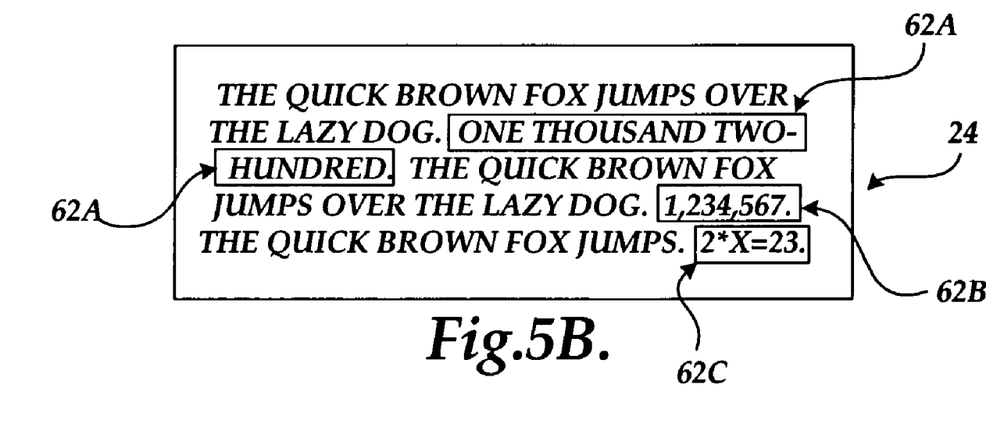

Turning now to FIGS. 5A and 5B, the effects of emphasizing mathematical information on an illustrative paragraph of text will be described. FIG. 5A illustrates an on-screen view of a paragraph of a document 24 prior to performing the process described above. As seen in FIG. 5A, the text of the document 24 is uniformly formatted. Following the execution of the algorithm described above, however, the numerical data will be emphasized in relation to the remainder of the document 24. This is illustrated in FIG. 5B.

As shown in FIG. 5B, emphasis 62A has been added to the phrase "one thousand two-hundred", including the intervening space and hyphen, emphasis 62B has been added to the number "1,234,567", including the thousands separators, and emphasis 62C has been added to the mathematical equation "2*X=23", including the mathematical operators and variables. It should be appreciated that in embodiments, only the numbers and number strings would be highlighted. It should also be appreciated that the highlighting 62A-62C would be removed following a second execution of the process described herein.

Based on the foregoing, it should be appreciated that the various embodiments of the invention include a method, system, apparatus, and computer-readable medium for emphasizing numerical information contained in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for emphasizing numerical data contained in an electronic document, the method comprising:
   determining whether a request to emphasize all of the numerical data in the electronic document has been received; and
   in response to receiving the request, locating all of the requested numerical data contained within the electronic document and emphasizing the located numerical data to distinguish the located numerical data from the remainder of content of the electronic document when displayed wherein locating all of the numerical data comprises,
      breaking sentences in the electronic document into words, and
      comparing the words to contents of a numerical search table, the contents of the numerical search table being user specified and configured to define types of numerical data to be located in the electronic document, the types of numerical data to be located specified by the numerical search table comprising at least the following: arabic numbers, cardinal numbers expressed as strings, ordinal numbers, roman numbers, and currency symbols.

2. The method of claim 1, wherein the electronic document comprises both text data and numerical data and wherein the request comprises a request to emphasize only the numerical data.

3. The method of claim 2, wherein the numerical data comprises numerals and numerals expressed as text data.

4. The method of claim 3, wherein the numerical data may be expressed in any of a plurality of natural languages.

5. The method of claim 4, wherein the numerals expressed as text data may comprise string numbers, ordinal numbers, or roman numerals.

6. The method of claim 5, wherein emphasizing only the numerical data comprises adding a highlighting attribute to the located numerical data.

7. The method of claim 6, wherein the highlighting attribute comprises a color attribute.

8. The method of claim 7, wherein a unique color attribute may be specified for each of the string numbers, the ordinal numbers, and the roman numerals.

9. The method of claim 8, further comprising:
receiving a request to deemphasize the located numerical data; and
in response to receiving the request, removing the emphasis from the located numerical data.

10. A computer-readable storage medium having computer-executable instructions stored thereon which, when executed by a computer, will cause the computer to perform the method of claim 1.

11. A system for emphasizing numerical data contained in an electronic document containing both text data and numerical data, the system comprising:
a memory storage; and
a processing unit coupled to the memory storage, wherein the processing unit is for executing instructions corresponding to:
a word processing application program for editing the text data and the numerical data within the electronic document; and
a dynamically linked library for use with the word processing application program, the dynamically linked library for receiving a request to emphasize all of the numerical data in the electronic document and to locate all of the requested numerical data contained within the electronic document and emphasize only the located numerical data to distinguish the located numerical data from the remainder of content of the electronic document when displayed in response to receiving the request, the dynamically linked library comprising instructions to,
break sentences in the electronic document into words, and
compare the words to contents of a numerical search table, the contents of the numerical search table being user specified and defining types of numerical data to be located in the electronic document, the types of numerical data to be located specified by the numerical search table comprising at least the following: arabic numbers, cardinal numbers expressed as strings, ordinal numbers, roman numbers, and currency symbols.

12. The system of claim 11, wherein the numerical data comprises numerals and numerals expressed as text data.

13. The system of claim 12, wherein the text data and the numerical data may be expressed in any of a plurality of natural languages.

14. The system of claim 13, wherein the numerals expressed as text data may comprise string numbers, ordinal numbers, or roman numerals.

15. The system of claim 14, wherein emphasizing only the numerical data comprises adding a highlighting attribute within the electronic document to the located numerical data.

16. The system of claim 15, wherein the highlighting attribute comprises a color attribute.

17. The system of claim 16, wherein the dynamically linked library further allows a unique color attribute may to specified for each of the string numbers, the ordinal numbers, and the roman numerals.

18. The system of claim 17, wherein the dynamically linked library further receives a request to deemphasize the located numerical data and, in response to receiving the request, to remove the emphasis from the located numerical data.

19. The system of claim 18, wherein removing the emphasis from the located numerical data comprises removing the highlighting attribute from the located numerical data.

* * * * *